United States Patent [19]
Lehrle et al.

[11] Patent Number: 6,005,066
[45] Date of Patent: Dec. 21, 1999

[54] ALIPHATIC POLYESTER COMPOSITION

[75] Inventors: Roy Sherwin Lehrle, Birmingham; Robert John Williams, Herts, both of United Kingdom

[73] Assignee: Monsanto Company, St. Louis, Mo.

[21] Appl. No.: 08/768,030

[22] PCT Filed: Jun. 13, 1995

[86] PCT No.: PCT/GB95/01375

§ 371 Date: Nov. 17, 1997

§ 102(e) Date: Nov. 17, 1997

[87] PCT Pub. No.: WO95/34599

PCT Pub. Date: Dec. 21, 1995

[30] Foreign Application Priority Data

Jun. 13, 1994 [GB] United Kingdom .................. 9411792

[51] Int. Cl.⁶ .............................. C08K 5/00; C08K 5/17; C08L 67/04
[52] U.S. Cl. .................... 528/328; 528/329.1; 435/71.1; 435/132; 435/135; 435/136; 435/128; 435/155
[58] Field of Search ................................. 528/328, 329.1; 435/132, 71.1, 135, 136, 128, 155

[56] References Cited

U.S. PATENT DOCUMENTS

| 4,477,654 | 10/1984 | Holmes et al. ................ 528/361 |
| 5,076,983 | 12/1991 | Loomis et al. ................ 264/101 |

FOREIGN PATENT DOCUMENTS

| 0 491 171 | 6/1992 | European Pat. Off. . |
| 0 628 586 | 12/1994 | European Pat. Off. . |

*Primary Examiner*—Nathan M. Nutter
*Attorney, Agent, or Firm*—Gary M. Bond; Arnold, White & Durkee

[57] ABSTRACT

A polymer composition comprises an aliphatic polyester and at least one compound of the general formula (I): $R^1_a(A)R^2_b$, where A is a polyfunctional hydrocarbon group; R1 is an electron-donating group such as hydroxy, amino, thiol, or a derivative thereof; R2 is an electron-withdrawing group such as carboxylic acid, carboxylic amide and quaternary onium; and a and b are at least 1.

21 Claims, 3 Drawing Sheets

ALIPHATIC POLYESTER COMPOSITION

CROSS REFERENCES TO RELATED APPLICATIONS

This application is the national phase entry of International patent application PCT/GB95/01375, filed Jun. 13, 1995, and claims priority from Great Britain patent application no. 9411792.6, filed on Jun. 13, 1994.

STATEMENT REGARDING FEDERALLY SPONSORED RESEARCH OR DEVELOPMENT

Not Applicable.

BACKGROUND OF THE INVENTION

1. Field of the Invention

THIS INVENTION relates to a polymer composition and in particular to a composition comprising an aliphatic polyester and a stabiliser against thermal decomposition.

2. Description of Related Art

Examples of such polyesters have become available commercially as the result of the development of microbiological processes for making them. The earliest example, PHB, was difficult to melt-process owing to low stability at its melting temperature. Corresponding copolyesters melt at a lower temperature. In addition, synthetic aliphatic polyesters of the head-to-head tail-to-tail type such as polybutylenesuccinate and of the head-to-tail type such as polylactic acid, polycaprolactone and synthetic polyhydroxyalkanoates, have recently become available. There is room for improvement in stability, such that greater freedom in choosing processing conditions and/or a wider range of end-uses could become available. This has recently arisen using the stereospecific polyesters produced microbiologically.

BRIEF SUMMARY OF THE INVENTION

It has now been found that compositions comprising such polyesters (which term includes homopolyesters, copolyesters and mixtures thereof) and one or more polyfunctional compounds of a defined class show substantial advantages.

DETAILED DESCRIPTION OF THE INVENTION

Figure 1:
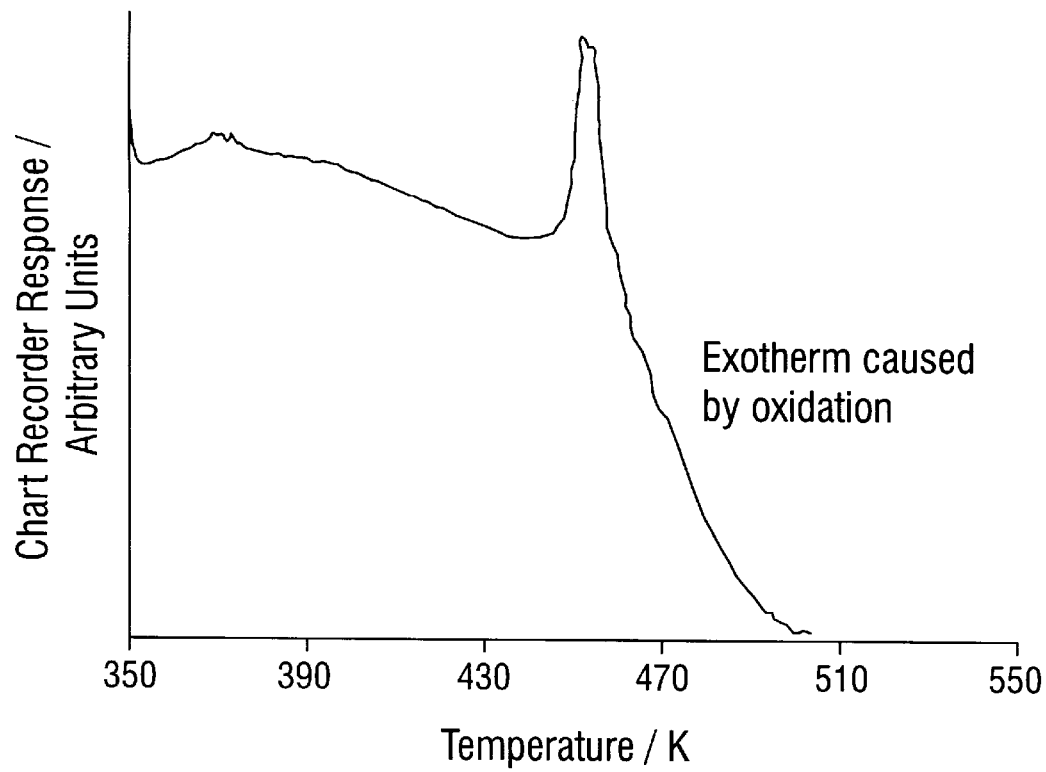
FIGS. 1 to 5 of the accompanying drawings show the DSC results obtained in respectively runs 1 to 5 of the Example.

According to the invention a polymer composition comprises an aliphatic polyester and at least one compound of general formula I:

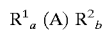
$$R^1_a (A) R^2_b \quad\quad\quad I$$

where A is a polyfunctional hydrocarbon group;
$R^1$ is an electron-donating group;
$R^2$ is an electron-withdrawing group; and
a and b are at least 1.

Hydrocarbon group A is preferably aliphatic, preferably containing a hydrocarbon chain of up to 8 carbon atoms with up to 6 carbon atoms in any side chain(s).

Groups $R^1$ are suitably selected from hydroxy, amino, thiol and derivatives thereof. Such an amino group preferably is primary or is secondary or tertiary carrying one or two lower alkyl ($C_{1-6}$) groups. It may be present in part in protonated form, especially in presence of weak acid such as carboxylic, for example in a zwitterion. Suitable derivatives are esters or amides, as mentioned further below. In such ester or amide the linkage to A is through O or N, respectively. Groups $R^1$ in any one such compound may be the same or different.

Groups $R^2$ preferably include at least one carboxylic acid and/or carboxylic amide and/or quaternary onium group, for example ammonium quaternised with lower alkyl, especially methyl. In such amide the carbon of the carboxylic group is linked to A directly. Group $R^2$ may be the same or different in any one such compound.

The numbers a and b preferably total 2 to 4.

The compound is preferably an amino carboxylic acid. Any one or more of the "essential" amino acids may be used, or corresponding acids of different chirality or in racemic form. Alternatively synthetic amino acids may be used. Preferably there is at least one group $R^1$ additional to the $CO_2H$ and β-amino group. Thus it is preferably for example asparagine, aspartic acid, arginine, cysteine, glutamic acid, glutamine, histidine, lysine, ornithine, serine, threonine, tryptophan or tyrosine or a mixture of two or more of these possibly with other amino acids.

When $R_2$ is a quaternary onium group a preferred compound is a quaternised alkanolamine, for example choline or a derivative thereof, especially a phosphatidyl choline.

If, instead of or in addition to the free compound, a derivative thereof is present, $R^1$ may be for example an ester or amide derived from a $C_{1-6}$ aliphatic carboxylic or carbonic or carbamic or phosphoric (including phosphatidyl) acid. Likewise $R^2$ may be an ester derived from a $C_{1-6}$ alcohol or an amide derived from ammonia or a $C_{1-6}$ amine. A compound oxidisable or reducible to the defined compound in accessible conditions can be used, for example cystine in place of cysteine. It is possible that such a derivative is a precursor decomposable to the defined compound during processing and/or ageing of the polyester. Likewise, a thermal and/or oxidative reaction product of the compound, such as may result from processing and/or ageing, may be added instead of free compound or derivative.

The compound may be a condensation polymer having $R^1_a (A) R^2_b$ as repeating unit, such as a synthetic or natural peptide or protein. Such peptide or protein may be the same as or different from proteinaceous material present with polyester in a microbiological fermentation product or resulting from treatments to recover polyester therefrom. If the same, then the polyester component is synthetic or is microbiological material from which protein has been extracted or in which an enhanced protein content is required.

Particular examples of suitable compounds include glutamine, phosphatidyl choline and a mixture of cysteine, lysine, proline, ornithine, and serine. The phosphatidyl group may be for example 1,2-diacylglycerophosphate ester, where the acyl groups are derived from $C_{12-20}$ aliphatic monocarboxylic acids, or a corresponding mono-acyl (lyso) group.

The invention includes:
(a) the composition as defined above, as freshly prepared;
(b) the composition after processing steps short of conversion to a finished article; and
(c) a finished article:
in which there is present the defined compound and/or whatever conversion product has been formed from it.

The proportion of the defined compound to polyester is sufficient to provide the desired stabilising effect, which depends on the requirements of intended processing conditions and end-use. Typically 0.05 to 5, especially 0.1 to 2.0 phr of the compound is used. ("phr" denotes "per hundred resin", that is, parts by weight of compound per hundred parts by weight of aliphatic polyester).

The polyester (hereinafter referred to as "PHA") is preferably capable of a relatively high level of crystallinity for example over 30%, especially 50–90%, in the absence of plasticiser. It suitably consists of or includes units of formula II:

$$—O—C_mH_n—CO—$$  II where m is in the range 1–13 and n is 2m or (additionally when m is at least 2) 2m−2. (It will be appreciated that n cannot be 2m−2 when m=1). Typically $C_mH_n$ contains 2–5 carbon atoms in the polymer chain and the remainder (if any) in a side chain. In very suitable polyesters n is 2m and especially there are units with m=3 and m=4 copolymerised together and having respectively a $C_1$ and $C_2$ side chain on the carbon next to oxygen in the chain. Particular polyesters contain a preponderance of m=3 units, especially with 70–90 mol % of such units, the balance being units in which m=4. The value of m in the composition may be arrived at by blending component PHAs having mol percentage of units differing in m value. The molecular weight $M_w$ of the PHA is for example over 50000, especially over 100000, up to eg $2\times10^6$.

In PHAs having units with m=3 and m=4 there may be very small, typically fractional, percentages of units having higher values of m. PHA consisting essentially of m=3 units is poly-3-(R)-hydroxybutyrate (PHB), and PHA consisting of m=3 and 4 units is polyhydroxybutyrateco-valerate (PHBV).

The PHA can be a product of fermentation, especially of a microbiological process in which a microorganism lays down PHA during normal growth or is caused to do so by cultivation in starvation of one or more nutrients necessary for cell multiplication. The microorganism may be wild or mutated or may have the necessary genetic material introduced into it. Alternatively the necessary genetic material may be harboured by an eukariote, to effect the microbiological process. Microbiologically produced PHA is (R)-stereospecific.

Examples of suitable microbiological processes are the following:
for Formula II material with m=3 or m=partly 3, partly 4:
  EP-A-69497 (*Alcaligenes eutrophus*)
for Formula II materials with m=3:
  U.S. Pat. No. 4,101,533 (*A. eutrophus* H-16)
  EP-A-144017 (*A. latus*).;
for Formula II material with m=7–13:
  EP-A-0392687 (various Pseudomonas).

The PHA can be extracted from the fermentation product cells by means of an organic solvent, or the cellular protein material may be decomposed leaving microscopic granules of PHA. For specialised end uses the cellular protein may be partly or wholly allowed to remain with the PHA, but preferably subjected to cell breakage.

Alternatively the PHA can be synthesised, for example as described by Bloembergen et al. in Macromolecules 1989, 22 1656–1663 (PHB) and 1663–1669 (PHBV).

If the polyester is wholly or partly synthetic, it may be for example a poly-2-hydroxyalkanoate such as polyglycollic acid or polylactic acid or a synthetic poly -propio- or -butyro- or -valero- or -capro- or -pivalo-lactone or a copolymer comprising repeating units corresponding to any of these.

Examples of other suitable synthetic polyesters are especially polyesters containing combinations of dicarboxylic acids and diols. Such dicarboxylic acids may be for example selected from the group consisting of malonic, succinic, glutaric, adipic, pimelic, azelaic, sebacic, fumaric, 2,2-dimethylglutaric, suberic, 1,3-cyclopentane dicarboxylic, 1,4-cyclohexane-dicarboxylic, 1,3-cyclohexane dicarboxylic, diglycolic, itaconic, maleic, 2,5-norbornane dicarboxylic and combinations thereof. Such diols may be for example selected from the group consisting of ethylene glycol, diethylene glycol, propylene glycol, 1,3-propanediol, 2,2-dimethyl-1,3-propanediol, 1,3 butanediol, 1,4-butanediol, 1,5-pentanediol, 1,6-hexanediol, 2,2-trimethyl-1,6-hexanediol, thiodiethanol, 1,3-cyclohexanedimethanol, 1,4-cyclohexanedimethanol, 2,2,4,4-tetramethyl-1,3-cyclobutanediol, triethyleneglycol, tetraethyleneglycol, di-, tri-, tetra- -propyleneglycol and combinations thereof. In the production of such polyesters there may be used ester-forming derivatives of the acids and/or diols, instead of or in addition to free acid and/or free diol.

The PHA of the composition preferably is of low nitrogen content, that is, less than 5000 ppm, especially less than 2000 ppm w/w as N. Such PHA may be for example the product of:
  (a) decomposing and separating cell debris from fermentation product; or
  (b) dissolving a cruder grade in an organic liquid and separating insolubles; or
  (c) extraction from fermentation product by means of such a liquid.

PHA made microbiologically and harvested by removal of cell debris is described in EP-A-0145233 and more recent co-pending applications.

The polyester component of the composition may contain more than one polyester, for example:
  (a) polyesters having the same repeating units but differing in molecular weight; part of the polyester component may be of too low a molecular weight to be usable alone as structural material;
  (b) polyesters having different combinations of repeating units;
  (c) polyesters of a different class—e.g. synthetic with microbiological—but mutually miscible;
  (d) polyester of a different class but not mutually miscible.
  (e) polyester, whether or not differing as (a) to (d), having a different history, for example a different manufacturer or extraction procedure or different previous processing such as re-work or recycle or end-group modification.

The composition may contain components in common use in plastics processing, for example:
  (a) one or more plasticisers;
  (b) inorganic filler, for example glass fibre, carbon fibre, platy or foil particle, silica, clay, magnesium silicate;
  (c) organic filler, for example, cellulose fibre or particulate, protein fibre, synthetic polymer particle or fibre, wood flour;
  (d) polymer other than polyester;
  (e) pigment;
  (f) nucleant, especially boron nitride, talc, ammonium chloride or DZB/Zn stearate, at preferably 0.2 to 2.0 phr
  (g) volatile solvent for the polyester and compound.;

If plasticiser is present, the ratio thereof to polyester depends on the intended use of the composition. The range 2–40 phr includes most of the likely uses. For making effectively rigid but not brittle articles the range 5–20 especially 6–12 phr is generally suitable. Any of the plasticisers known for these polyesters or found subsequent to this invention would be suitable. Examples are:

(a) high boiling esters of polybasic acids, such as phthalates, isophthalates, citrates, fumarates, glutarate, phosphates or phosphites. The esterified radicals may be for example $C_1$–$C_{12}$ alkyl, aryl or aralkyl. Particular examples are dioctyl-, diheptyl- and diundecyl- phthalates and dialkylalkylene oxide glutarate (Plasthall 7050);

(b) high boiling esters and part-esters of polyhydric alcohols, especially glycols, polyglycols and glycerol. The acid-derived radicals of the ester typically contains 2–10 carbon atoms. Examples are triacetin, diacetin and glyceryl dibenzoate;

(c) aromatic sulphonamides such as paratoluene sulphonamide.

A particularly preferred plasticiser is a doubly esterified hydroxycarboxylic acid having at least 3 ester groups in its molecule. "Doubly esterified" means that at least some of the hydroxy groups of the hydroxycarboxylic acid are esterified with a carboxylic acid and at least some of the carboxy groups thereof are esterified with an alcohol or phenol. Preferably at least the hydroxycarboxylic acid from which the ester is derived is aliphatic or cycloaliphatic. Its backbone structure (that is, apart from carboxy groups) preferably contains 2–6 carbon atoms. It contains preferably 2–4 carboxy groups and 1–3 hydroxy groups; and preferably the number of carboxy groups exceeds the number of hydroxy groups. An example of such a plasticiser is acetyl-tri-n-butyl citrate, available as Estaflex (Trade mark of AKZO Limited).

According to a further aspect of the invention a method of making the composition comprises blending the polyester with the compound.

This may be effected by for example:

(i) mixing the compound with the polyester in particulate form, for example in particles smaller than 1000, especially smaller than 100, micrometers. Preferably the particles are in the size range 0.1 to 50 micrometers. The particles are especially the product of solubilising and removing non-polyester cell material from a microbiologically produced biomass. The compound can be introduced at any convenient stage, including stages before the particles are isolated from aqueous medium;

(ii) melting a mixture of polyester with compound. The mixture is preferably as made by method (i). Other components, for example as above, especially those that assist melting, may be present;

(iii) bringing the polyester and compound together in a volatile solvent for the polyester. The solvent may have been introduced as a means of extracting the polyester from a microbiologically produced latex. It can then be removed or not, according to the requirements of further processing.

Suitable solvents include cyclic carbonate esters and halogenated hydrocarbons such as dichloromethane, chloroform and 1,2-dichloroethane.

A particular process comprises:

(i) forming a biomass of cells containing PHA granules and non-PHA cell material by fermentation;

(ii) treating the cells to solubilise non-PHA cell material;

(iii) separating the PHA granules from the liquid phase;

and is characterised by introducing at least one compound as hereinbefore defined.

The process may include treating the granules with a peroxide whereby to solubilise non-PHA material additional to what has been or will be solubilised in step (ii), and separating the granules from the resulting liquid phase. The compound may be introduced before the polyester has been isolated from the latex produced by the fermentation. If the compound is a condensation polymer, it may be a stabilising quantity of nitrogenous material separated from the PHA granules.

In a yet further aspect the invention provides a process of making a shaped article by confining, eg in a mould or on a surface or through a die, a composition as defined above., Particular methods include injection moulding, compression moulding, extrusion of fibres or film, extrusion of profile, gas-current spinning, tack spinning, coating on to substrate, any of these being carried out, as appropriate, using the composition in the form of melt, particulate or solution in volatile solvent. Examples of shaped articles made by such methods include films especially for packaging, coated products (such as paper, paperboard and non-woven fabrics), fibres, non-woven fabrics, extruded nets, personal hygiene products, bottles and drinking vessels, agricultural and horticultural films and vessels, slow-release devices and ostomy bags.

Alternatively the composition with suitable additives can be used as an adhesive.

Test Procedures

Sample Preparation (a) Mixing With Additive

Finely divided polyester (0.5 g) was mixed with compound, compressed into blocks at 180° C. for 5 min, then cooled and held at 60° C. for 10 min to allow crystallisation to occur.

(b) DSC Specimen

A compressed block was dissolved in chloroform at reflux temperature. A few drops of the solution were cast into an aluminium pan of the DSC instrument (see below) to give a specimen mass 5.6±0.1 mg.

DSC Examination

This technique measures the energy flow towards or from a specimen in comparison with an inert reference as a function of time and temperature. A DSC instrument typically includes two isolated insulated holders on each of which a pan containing respectively the test specimen or the reference is mounted. The heat flow is measured and compensated for, to maintain the temperature with respect of the reference.

A Perkin Elmer DSC-1B instrument was used, in dynamic mode using a 8° C. $min^{-1}$ temperature ramp, from 350K (77° C.) to ca. 550K (307° C.). A flow of oxygen was maintained over the specimens at 4.0 $dm^3$ $h^{-1}$. The starting temperature was held for about 2 min to allow for thermal equilibrium, before beginning the ramp.

Presentation of Results

The DSC instrument was linked to a Venture RE 511.20 chart recorder, which produced a graph of detector response (ordinate: arbitrary units, positive represents endotherm) against temperature (abscissa: K, negative represents exotherm attributed to oxidation).

Figure 2:
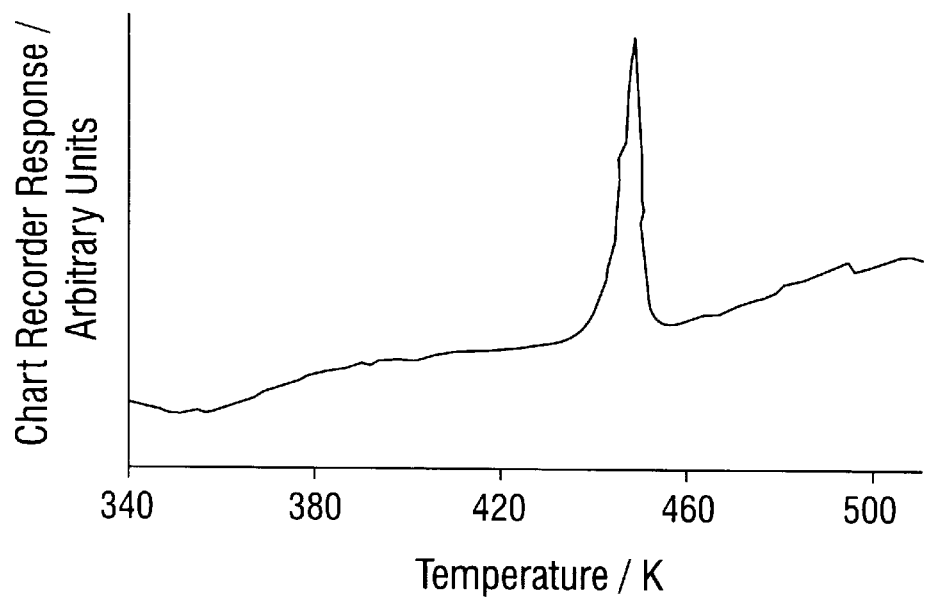
Figure 3:
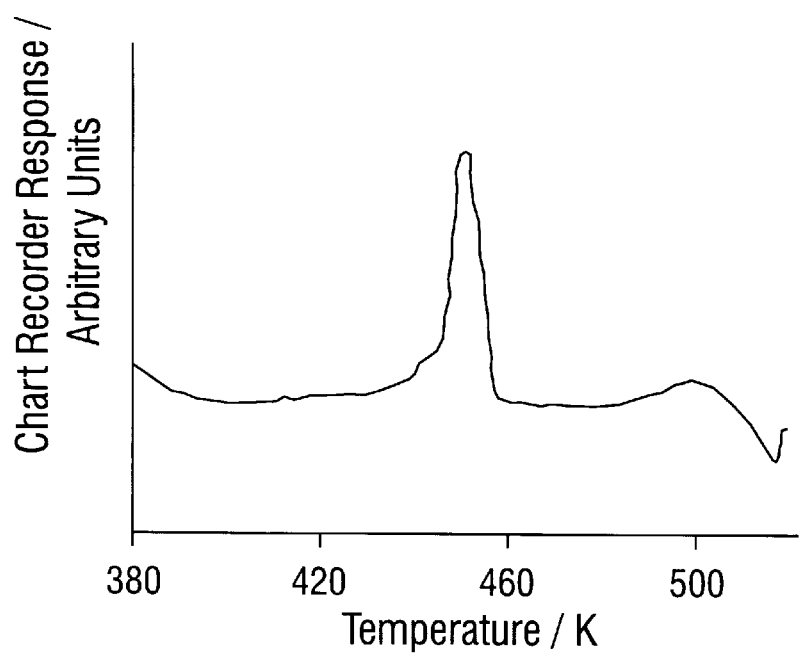
Figure 4:
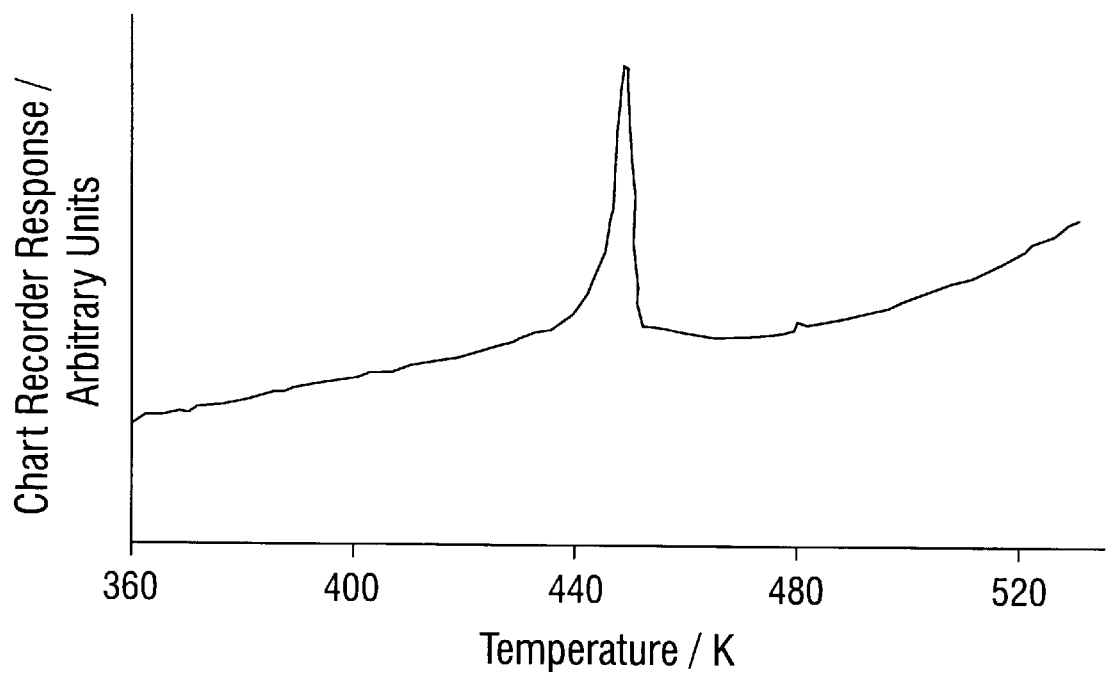
Figure 5:
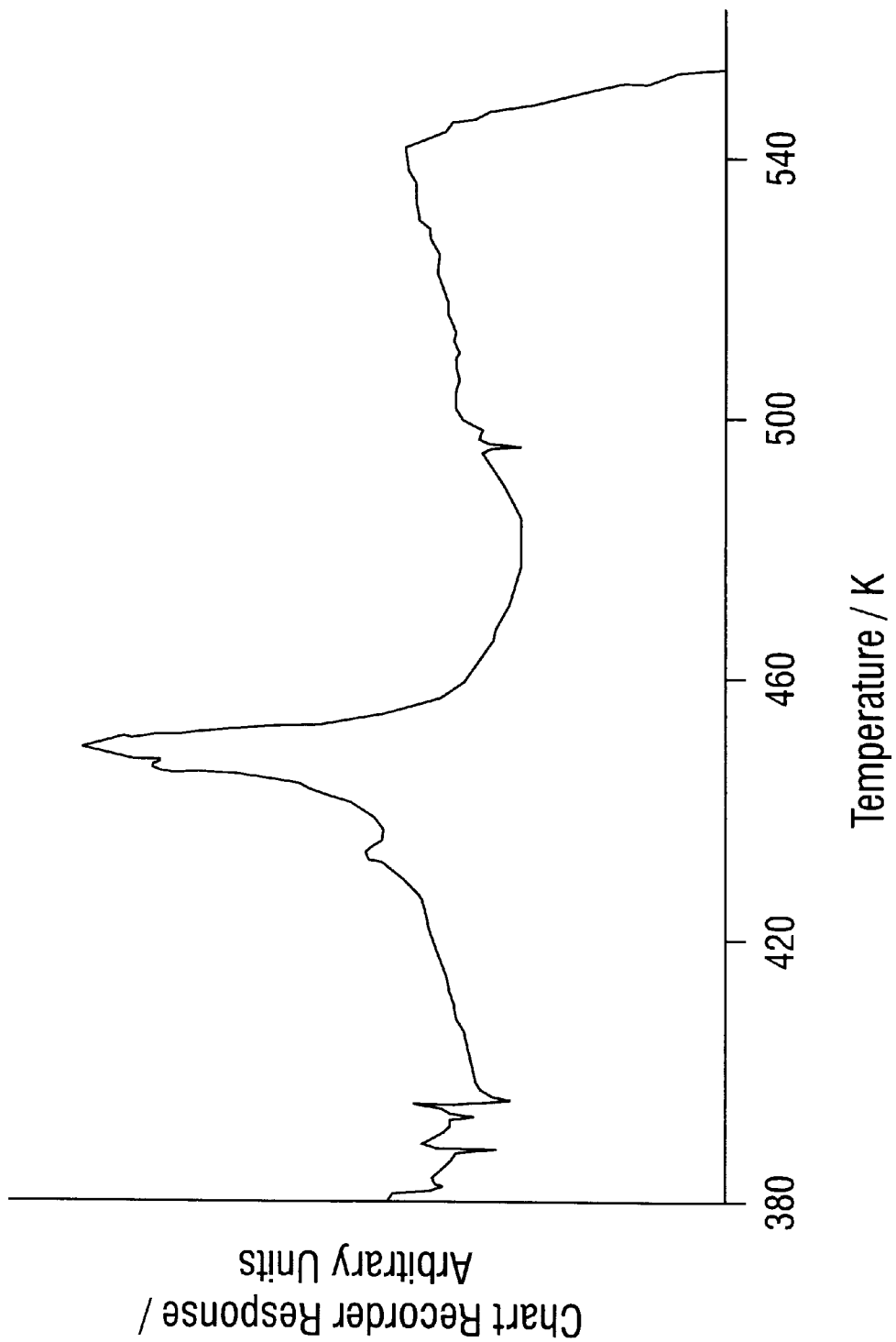

FIGS. 1 to 5 of the accompanying drawings show the DSC results obtained in respectively runs 1 to 5 of the Example.

EXAMPLE

Polyester compositions were prepared from a poly-3-hydroxybutyrate (PHB) of this specification:

Structure: PHB homopolymer (formula II, m=3);
molecular weight Mw 870000; Mn 228000;
origin: fermentation of glucose by *Alcaligenes eutrophus*;
extraction: enzymatic cell-debris removal;
purification: to under 100 ppm N.

The compositions and their behaviour were as follows:

1 PHB control without additives: there is a peak at 448K (175° C.) for the endotherm of polymer melting.

Then follows, at up to about 482K (209° C.), a rather steep fall to 25 units below the response level before the peak, showing that an exothermic process is taking place. An exotherm of such magnitude is normally associated with oxidative degradation processes.

2 PHB with 5000 ppm w/w of the amino acid mixture (parts by weight): cysteine 1; lysine 7; ornithine 15; proline 13; serine 19.

3 PHB with 5000 ppm w/w of glutamine.

4 PHB with 5000 ppm w/w of phosphatidyl choline (XI-E from fresh egg yolk: P2772 in Sigma Chemicals Catalogue).

In 2–4 the melting peak endotherm is present as in 1. The onset of the exothermic oxidation peak is pushed significantly to higher temperatures, indicating that the additives stabilises the polyester against exothermic decomposition.

5 PHB with 4000 ppm w/w of alanine: the trace is intermediate between 1 and 2–4, showing that a moderate degree of stabilisation has taken place.

We claim:

1. A process for increasing the oxidation resistance of an R-stereospecific microbiologically produced polyester consisting of or including unite of the formula:

where m is 3 to 4 and n is 2m, which comprises blending therewith at least one compound of general formula:

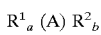

where A is a polyfunctional hydrocarbon group;

$R^1$ is an electron-donating group selected from hydroxy, amino and thiol and derivatives thereof;

$R^2$ is an electron-withdrawing group selected from carboxylic acid, carboxylic ester, carboxylic amide and quaternary ammonium; and a and b are at least 1.

2. A process according to claim 1, in which the content of the compound is 0.1 to 2.0 phr w/w.

3. A process according to claims 1 or 2 in which the compound is selected from aspartic acid, asparagine, glutamic acid and glutamine.

4. A process according to claims 1 or 2 in which the compound is selected from arginine, ornithine and lysine.

5. A process composition according to claim 4 in which the compound comprises lysine and ornithine in admixture with at least one amino carboxylic acid selected from cysteine, proline and serine.

6. A process according to claim 1 or claim 2 in which the compound is a phosphatidylcholine.

7. A process according to claim 1 in which the polyester is capable of over 30% crystallinity in the absence of plasticiser.

8. A process according to claim 7 in which the polyester m=3 units and m=4 units having respectively a $C_1$ and $C_2$ side chain on the carbon atom next to oxygen in the chain are copolymerised together.

9. A process according to claim 8 in which the polyester contains 70–90 mol % of m=3 units, the balance being m=4 units.

10. A process according to any one of claims 7 to 9 in which the polyester contains less than 2000 ppm w/w of nitrogen as N.

11. A process according to any one of claims 1, 2, 8, 9 or 10 which comprises mixing the compound with the polyester in finely divided particle form.

12. A process according to claim 11 in which the polyester particles are the product of solubilizing and removing non-polyester material from a microbiologically produced biomass.

13. A polymer composition comprising an R-stereospecific microbiologically produced polyester consisting of or including units of the formula:

where m is 3 to 4 and n is 2m
and at least one compound of general formula:

where A is a polyfunctional aliphatic hydrocarbon group containing a hydrocarbon chain of up to 8 carbon atoms with up to 6 carbon atoms in any side chain(s);

$R^1$ is an electron-donating group selected from hydroxy, amino and thiol and derivatives thereof;

$R^2$ is an electron-withdrawing group selected from carboxylic acid, carboxylic ester, carboxylic amide and quaternary ammonium; and a and b are at least 1;

subject to the conditions that either:

a+b=2, $R^1$ is hydroxy or esterified hydroxy and $R^2$ is quaternary ammonium; or a+b=3 or 4, $R^1$ is selected from hydroxy, amino or thiol and $R^2$ is carboxylic acid, ester or amide.

14. A composition according to claim 13 in which the content of the compound is 0.1 to 2.0 phr w/w.

15. A composition according to claims 13 or 14 in which the compound is selected from aspartic acid, asparagine, glutamic acid and glutamine.

16. A composition according to claims 13 or 14 in which the compound is selected from arginine, ornithine and lysine.

17. A composition according to claims 13 or 14 in which the compound is a phosphatidylcholine.

18. A composition according to any one of claims 13 to 17 in which the polyester is capable of over 30% crystallinity in the absence of plasticiser.

19. A composition according to claim 18 in which the polyester m=3 units and m=4 units having respectively a $C_1$ and $C_2$ side chain on the carbon atom next to oxygen in the chain are copolymerised together.

20. A composition according to claim 19 in which the polyester contains 70–90 mol % of m=3 units, the balance being m=4 units.

21. A composition according to any one of claims 17 to 19 in which the polyester contains less than 2000 ppm w/w of nitrogen as N.

* * * * *